(12) United States Patent
Smith

(10) Patent No.: US 9,838,332 B1
(45) Date of Patent: Dec. 5, 2017

(54) DYNAMICALLY MEETING SLAS WITHOUT PROVISIONING STATIC CAPACITY

(71) Applicant: Spanning Cloud Apps LLC, Hopkinton, MA (US)

(72) Inventor: Clif Smith, Austin, TX (US)

(73) Assignee: SPANNING CLOUD APPS LLC, Hopkinton, MA (US)

( * ) Notice: Subject to any disclaimer, the term of this patent is extended or adjusted under 35 U.S.C. 154(b) by 328 days.

(21) Appl. No.: 14/788,194

(22) Filed: Jun. 30, 2015

(51) Int. Cl.
G06F 17/30 (2006.01)
H04L 12/911 (2013.01)
H04L 12/26 (2006.01)
G06F 11/14 (2006.01)

(52) U.S. Cl.
CPC .......... *H04L 47/78* (2013.01); *G06F 11/1402* (2013.01); *H04L 43/04* (2013.01)

(58) Field of Classification Search
USPC ....................................... 709/226, 221, 227
See application file for complete search history.

(56) References Cited

U.S. PATENT DOCUMENTS

| | | | |
|---|---|---|---|
| 8,260,757 B1* | 9/2012 | Chatterjee | G06F 17/3056 370/230 |
| 2007/0179929 A1* | 8/2007 | Fujiyama | G06F 17/30575 |
| 2011/0099403 A1* | 4/2011 | Miyata | G06F 1/32 713/323 |
| 2014/0280340 A1* | 9/2014 | Rabolt | G06F 17/30477 707/775 |

* cited by examiner

*Primary Examiner* — Jude Jean Gilles
(74) *Attorney, Agent, or Firm* — Slater Matsil, LLP

(57) ABSTRACT

In one example, a method for identifying and allocating resources in a computing system, including checking, while one or more backup processes are running, database connections in an auto scaling group to determine if a number of database connections in use in connection with the backup processes has decreased since a prior check was performed. When the number of database connections in use has decreased, an identification is made as to which of a plurality of queues each respectively associated with one of the backup processes has the greatest need for additional database connections. Next, various metrics are evaluated and, based on the evaluation of the metrics, one or more available database connections are assigned to the queue with the greatest need for additional database connections.

20 Claims, 6 Drawing Sheets

DYNAMICALLY MEETING SLAS WITHOUT PROVISIONING STATIC CAPACITY

FIELD OF THE INVENTION

Embodiments of the present invention generally concern data backup and restoration. More particularly, at least some embodiments of the invention relate to systems, hardware, computer-readable media, and methods directed to backup processes that make efficient use of dynamically available backup resources but without overloading or otherwise compromising the performance of the backup resources.

BACKGROUND

Entities often generate and use data that is important in some way to their operations. This data can include, for example, business data, financial data, and personnel data. If this data were lost or compromised, the entity may realize significant adverse financial and other consequences. Accordingly, many entities have chosen to back up some or all of their data so that in the event of a natural disaster, unauthorized access, or other events, the entity can recover any data that was compromised or lost, and then restore that data to one or more locations, machines, and/or environments.

While data backup is a valuable and important function, the ever increasing volume of data that is generated presents significant problems. Thus, many companies today find their backup and recovery processes strained as data growth in enterprise IT environment continues to accelerate at exponential rates, while data-protection solutions have struggled to keep pace. At least some of the problems encountered in connection with backup processes concern the way in which backup resources are provisioned.

For example, one approach to providing backup resources is provisioning static backup resource capacity. In general, this type of provisioning may involve identifying and reserving backup resources expected to be needed for one or more backup processes. In this way, some assurance can be provided that a certain amount backup resources will be available at the time the backup is to be performed. As discussed below however, provisioning static capacity lacks the flexibility to respond to changing backup requirements. Moreover, this lack of flexibility causes inefficiencies in that it can result in overutilization of some backup resources and/or underutilization of other backup resources.

With regard to the problem of flexibility, customer backups are sometimes scheduled on a daily or other periodic basis, and may be performed with respect to one or more of a variety of variables, one example of which is object type. Thus, the amount of backup work to be performed during any given time period can vary significantly depending on such considerations as the volume of customer changes that have been made concerning the various object types. As well, the volume of changes can vary from one customer to another. An additional complicating factor is that priorities may vary as among backups to be performed, with performance of some backups having a relatively higher priority than performance of other backups. Further, the need for a backup can be identified at any time. Considerations such as these can make it difficult to identify and provision backup resources for one or more backups.

More particularly, it can be difficult to perform effective provisioning of static capacity without having timely and accurate information as to what the needs for the backup resources are likely to be. However, because the extent to which backup resources are needed at any given time can be quite dynamic, there will invariably be guesswork involved in provisioning static backup capacity, with the result that in some cases, too many resources, or excess capacity, will be provisioned, thus wasting available capacity that could be used for other processes. In other cases, it can turn out that the capacity of backup resources that have been provisioned is inadequate. In this instance, there is a significant risk that the enterprise responsible for performing the backup may not meet the terms of its customer service level agreement (SLA) with one or more customers. One solution to this latter problem is to purchase additional backup resources. However, this is an expensive and inefficient solution.

In light of problems and shortcomings such as those noted above, it would be useful to be able to utilize backup resources in an efficient manner. It would also be useful to be able take backups while automatically and dynamically taking into account ongoing variations in backup resources needed, and available. Finally, it would be useful to be able to perform necessary backups without overloading or otherwise compromising backup resources such as database servers and storage.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
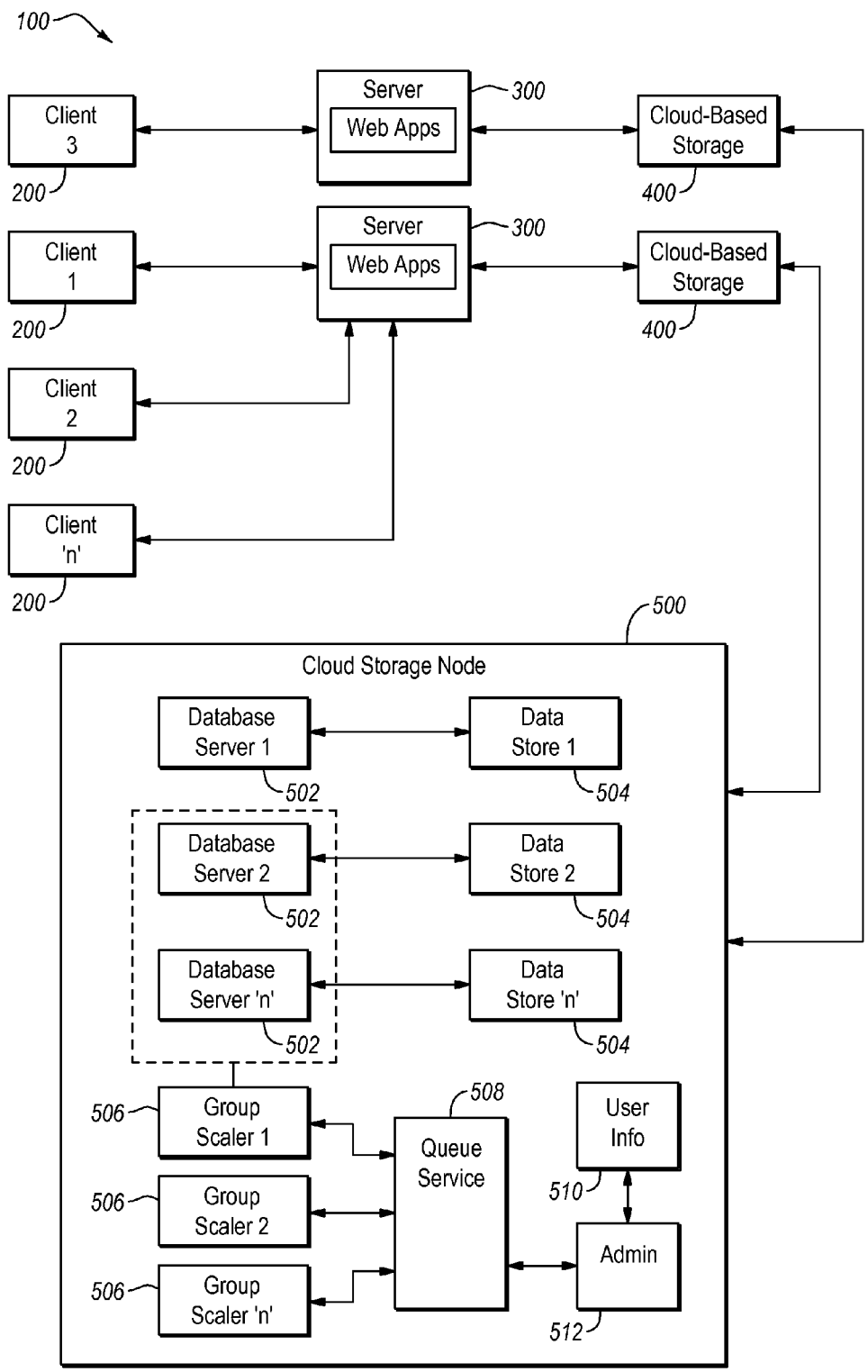
FIG. 1 is directed to aspects of an example operating environment for at least some embodiments.

Embodiments of the present invention generally relate to systems, hardware, computer-readable media, and methods directed to backup processes that make efficient use of dynamically available backup resources but without overloading or otherwise compromising the performance of the backup resources. In general, embodiments of the invention can be partly, or completely, implemented in a cloud environment, such as between or among two or more cloud based entities, although deployment in a cloud environment is not required for embodiments of the invention. For example, both a backup target, and a database server that receives the backup data and/or directs storage of the backup data, can be located in a single common cloud environment.

Alternatively the backup target and the database server can reside in different respective cloud environments. Correspondingly, it may be the case that the data of the backup target is not locally generated or stored at a user location.

Embodiments of the invention may be particularly useful in environments where one or more of various factors are present, or expected to be. Such factors include, but are not limited to, daily (and/or other) changes in scheduled work, random on-demand work that must be performed, and limited and unpredictable availability of dependent resources, such as database servers and data stores. In order to deal with these and/or other constraints, embodiments of the invention may implement any one or more of a variety of different techniques.

One such technique is the use of object types as a basis for segmentation of customer data. Such object types may include, but are not limited to, calendars, contacts, emails, documents, and sites. Another technique employed by some embodiments of the invention involves the definition and use of queues in which object types are segmented into chunks of backup work that may differ in one or more of their characteristics. That is, a particular queue may identify several different backups that are to be performed, all of which concern the same object type, or types. Although the object types may be the same, it may be useful to further characterize or differentiate different chunks of work, within a given queue, in various ways.

For example, different respective chunks of work can be characterized as a scheduled backup, as an on-demand backup, and as an on-boarding backup such as might occur when a service provider performs an initial baseline backup for a new customer. Depending upon considerations such as their characterization, the different chunks of work can be assigned different respective priorities either automatically, or by a user. By way of illustration, on-demand backups can be assigned a relatively high priority, while on-boarding backups may be assigned a relatively low priority, and scheduled backups can be assigned a priority level between on-demand backups and on-boarding backups.

To provide backup services such as those just described, and/or others, embodiments of the invention can use one or more auto scaling groups of database servers to provide backup services to one or more backup targets or clients. In general, the amount of backup work performed by an auto scaling group can be automatically adjusted, that is, auto scaled, based in part on the needs of the associated computing environment and the availability of the database servers in the auto scaling group.

A variety of metrics can be used to drive the auto scaling process. For example, one metric that can be taken into consideration is the number of connections that are available to the database servers in an auto scaling group. Another metric is the total number of messages in the various queues. As a further example of a metric, the 'burn down' rate of a queue can be taken into consideration, that is, the rate at which data identified by the queue is being backed up.

In operation, embodiments of the invention can periodically check the availability of database connections. The number of database connections will decrease when, for example, a queue is exhausted and the database connection, or connections, used to back up the data identified by that queue is/are no longer needed. If an adequate number of connections are available, the various queues will be examined to determine, for example, which queue needs the most additional capacity. This determination can be made, for example, by examining the burn down rate of the queue, and the amount of work remaining to be done for the queue. With this information, additional connections can be assigned to serve the queue, up to a defined connection limit that ensures the database servers will not be overloaded.

Advantageously then, embodiments of the invention provide the flexibility to respond to changes in workload requirements, and changes in the availability of database server capacity. Moreover, embodiments of the invention provide for relatively efficient resource usage by reducing, or even substantially eliminating, over-utilization and under-utilization of database servers. Finally, embodiments of the invention are configured to avoid database server overload conditions.

It should be understood that the term 'backup,' as used herein, is intended to be broadly construed and is not limited to any particular type or form of backup. Thus, backup, as contemplated by this disclosure, embraces, but is not limited to, full backups, snapshots, incremental backups, de-duplicated backups, and any other circumstance or process where data that is desired to be protected is copied to one or more backup resources for protection and restoration.

A. Aspects of Example Operating Environments

In general, embodiments of the invention may include and/or be implemented in an operating environment that includes one or more clients that generate data that is desired to be protected in some way, such as through the use of one or more backups. The clients may generate this data in connection with one or more web-based applications hosted by a third party service, and the data may be stored in cloud storage that may be associated with the third party service. This stored data may be backed up by a cloud based backup service that uses one or more cloud storage nodes.

With the foregoing in mind, attention is directed now to FIG. 1 which discloses one example of an operating environment that may be suitable for one or more embodiments of the invention. In FIG. 1, the example operating environment is denoted at 100 and may be a network such as a local area network, a wide area network, or any other networked configuration. Moreover, the operating environment 100, or any group of one or more of its elements, may comprise, form an element of, or constitute, a cloud computing environment. For example, one or more nodes, discussed below, may comprise elements of a cloud computing environment. The operating environment 100 may include various devices including servers and other computers that are interconnected. The operating environment 100 may employ a variety of communication media, such as hardwire, wireless, or some combination thereof. In some instances, some or all of the operating environment 100 may comprise an optical communication network.

As indicated in FIG. 1, the example operating environment 100 includes one or more clients 200 which can generate and/or cause the generation of data that is desired to be backed up. As used herein, the term data is intended to be construed broadly and includes any and all types of data in whatever form or format, examples of which include but are not limited to, data blocks, atomic data, directories, volumes, and objects such as, but not limited to, calendars, contacts, documents, emails, and sites, and any group of one or more of the foregoing.

This data can be generated, for example, in connection with the operation of one or more web-based applications that are hosted by a server 300, such as a third party server. Examples of such web-based applications include, but are not limited to, any or all of the various applications in the Google Apps suite, such as an email application that may include calendar functionality as well as the ability to define and store contacts, word processing applications, spreadsheet applications, as well as any other application that can be used to generate one or more documents. More generally, embodiments of the invention can be employed in connection with any application, or group of applications, in connection with data can be generated.

As further indicated in FIG. 1, data generated in connection with operation of the web-based applications can be stored in cloud-based storage 400 by, or at the direction of, the host of the web-based application, such as server 300. In this example operating environment 100, the cloud-based storage 400 serves as the primary storage for client data generated in connection with the operation of the web-based applications, and it may be the case that no client data is stored locally at the clients 200.

Because the cloud-based storage 400 is the primary storage for data generated in connection with the operation of the web-based applications, there is a need to be able to backup that data for safekeeping, and later restoration to one or more targets. Accordingly, and as further indicated in FIG. 1, one or more cloud storage nodes 500 can be provided that communicate with the cloud-based storage 400. In general, and as discussed in more detail below, the data from the cloud-based storage can be backed up at the cloud storage node 500.

In the illustrated example, the cloud storage node 500 includes one or more database servers 502, each of which communicates with a respective data store 504. The database servers 502 can be separate from, or integrated with, their respective data store 504. The data stores 504 can each take the form of one or more databases, and each database can have one or more connections by way of which data can be stored in the corresponding database. In at least some embodiments, the actual backed up data is stored at the data stores 504, while metadata concerning the backed up data is stored at the database servers 502. In these example embodiments, the metadata stored at the database servers 502 may take the form of pointers that identify the location of the backed up data in the data stores 504. The database servers 502 can provide a variety of services including, but not limited to, data analysis, data storage, data manipulation, and data archiving.

The cloud storage node 500 also includes one or more instances of a group scaler 506, a queue service 508 that generates queues and includes queue information, and a user information database 510 that may include, for example, information concerning authorized users of the cloud backup service, such as the identity of the user, the object type(s) that the user needs to have backed up, and the amount of data associated with that user. An administrator 512 may control and coordinate some or all of the operations at the cloud storage node 500.

In some instances, the queue service 508 can be an element of the group scaler 506, although that is not required. In general, multiple group scalers 506 can be provided, one for each different product, such as email for example, and each group scaler 506 may be associated with a respective auto scaling group (see, e.g. FIG. 4) that includes one or more database servers 502. In the illustrated example, two database servers 502 form an auto scaling group, indicated by the phantom outline, in connection with which group scaler 1 operates. It should be noted that an auto scaling group can include any number of database servers, and the auto scaling group illustrated in FIG. 1 is presented solely by way of example.

Any one or more of the clients 200, servers 300, cloud-based storage 400, cloud storage node 500, database servers 502, and data stores 504 may be physical machines, virtual machines (VM), or any other suitable type of device. As well, the clients 200, servers 300, cloud-based storage 400, and cloud storage node 500 may all reside together in a single cloud environment, or in a variety of distinct cloud environments. For example, in one embodiment, the cloud-based storage 400 resides in a first cloud environment, while the cloud storage node 500, where one or more backups of data from the cloud-based storage 400 are stored, resides in a second cloud environment.

In general, and as discussed in more detail below, the group scaler 506 periodically surveys the database servers 502 to determine if database connections are available that can be used to service the queues identified by the queue service 508. If database server 502 connections are determined to be available, the group scaler(s) 506 then assign those connections to backups in the one or more queues, using various criteria.

B. Example Host Configuration

Figure 2:
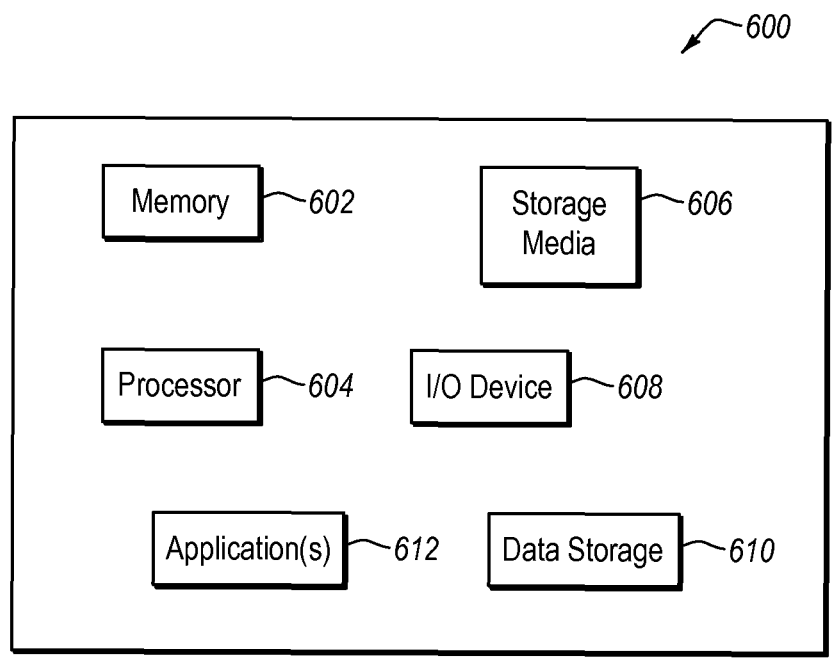
FIG. 2 is directed to an example implementation of a host device.

With reference briefly to FIG. 2, one or more of the clients 200, servers 300, cloud-based storage 400, and database servers 502 can take the form of a physical computing device, one example of which is denoted at 600. In the example of FIG. 2, the computing device 600 includes a memory 602, one or more hardware processors 604, non-transitory storage media 606, I/O device 608 such as a graphical user interface, mouse, keyboard, stylus, and/or any other display and input or output devices, and data storage 610. As well, one or more applications 612 are provided that comprise executable instructions. Such executable instructions can take the form of one or more of a backup application, a backup client, a manager client, or a manager application.

C. Aspects of Example Queues and Queue Generation

In general, queues are used to identify the backup work that is required to be performed. A queue can be specific to a particular object type, although that is not necessarily required, and queues can be correlated in any other suitable way with the work that is to be performed. As well, the queues can include or provide information on metrics concerning the queue, such as the burn down rate associated with that queue, the amount of work in the queue that has been completed, and the amount of work in the queue that remains to be completed. Still other metrics, such as the time work on the queue was started, and stopped, can be captured. As well, the elapsed time required to perform work in the queue can be captured. The metrics disclosed herein are provided only by way of example and, more generally, any metric(s) concerning the queue or performance of work associated with the queue can be monitored and captured. Among other things, queue metrics such as burn down rate, and total number of messages per queue, can be used by the group scaler to allocate assets, such as database connections, that can be used to perform the work identified in the queue.

Figure 3:
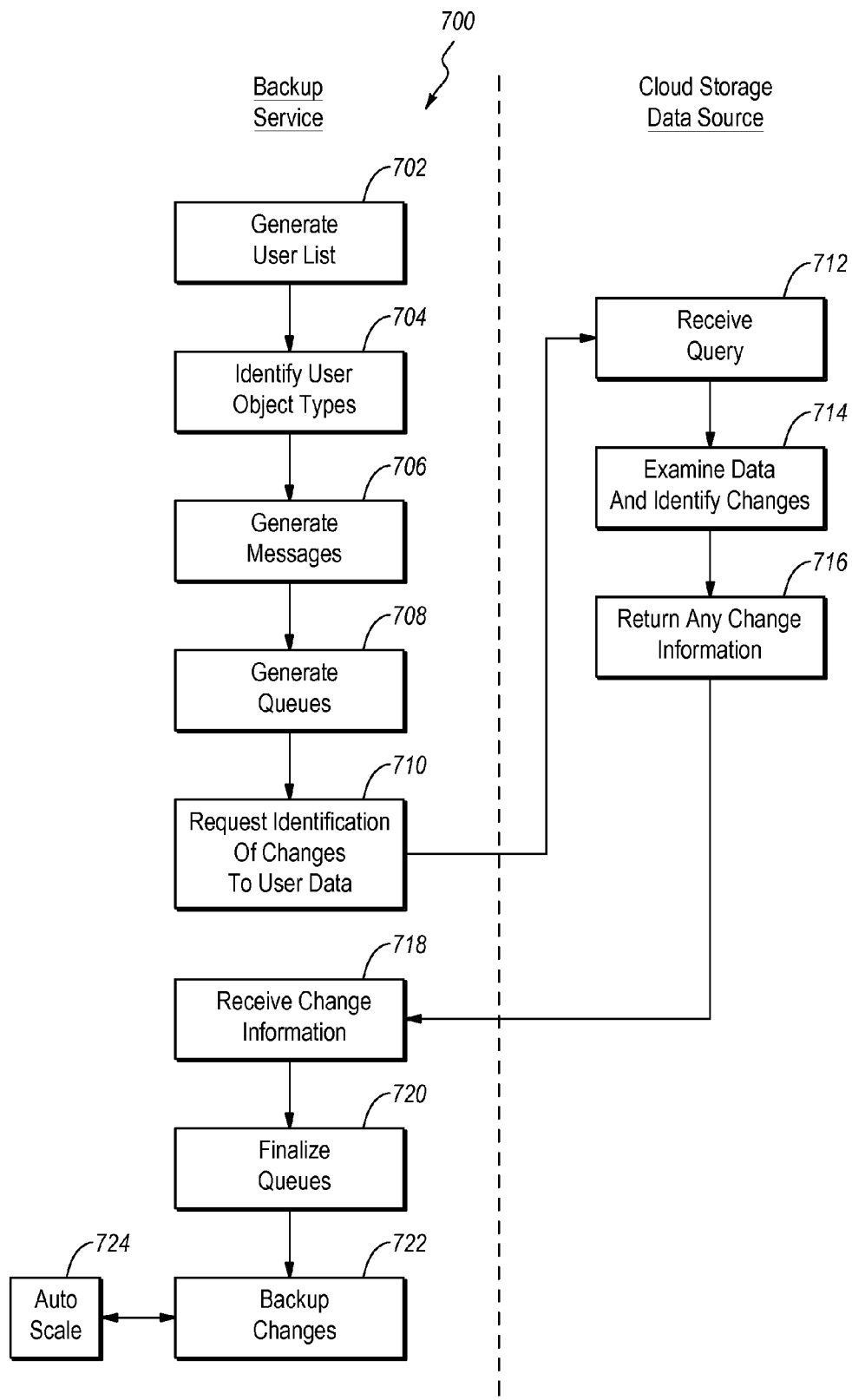
FIG. 3 is a flow diagram disclosing aspects of an example process for identifying and backing up data.
Figure 3A:
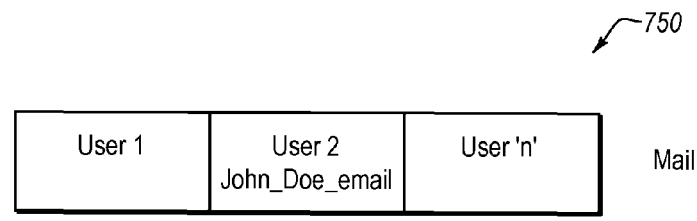
FIG. 3a is a diagram disclosing aspects of an example queue.

Directing attention now to FIGS. 3 and 3a, details are provided concerning some example queues, and processes for generating queues. In general, these processes may be performed by, and/or at the direction of, the entity that operates the cloud storage node 500 to back up data that resides on cloud-based storage 400. This entity can be a cloud backup service for example.

In the example process 700 disclosed in FIG. 3, identification of data that is to be backed up can begin by querying a user information database to generate 702 a list of users that meet certain criteria, such as users with a paid up license, and/or trial users of a cloud backup service. This query can be performed by, or at the direction of, an administrator, such as administrator 512 (FIG. 1) or another entity. As part of the query, or subsequently, the particular object type(s) that each user needs to have backed up may be identified 704. For example, a user 'John Doe' may have specified that mail, documents, calendars, and contacts should be backed up. It should be noted that the user need not be a person but, more generally, can be any entity that may be involved in the generation and/or modification of data that requires backup.

After each user, and the object type(s) specified by that user, have been identified, a series of messages may be generated 706, such as by the administrator for example, that will ultimately be used to aid in identifying the data that needs to be backed up. Each message identifies, at least, a user, and a backup object type specified by that user. To continue with the 'John Doe' example, four messages would be generated. These messages can have any suitable format but for the purposes of illustration can be identified thus: John_Doe_mail; John_Doe_document; John_Doe_calendar; and, John_Doe_contact. The messages may, but need not, each have unique message identifiers.

Once generated, the messages are sent to a queue service, for example, which then aggregates the messages in the form of one or more queues 708. Each queue thus generated may be specific to a particular object type. Thus, the queue containing the John_Doe_email message may also include one or more additional messages, such as Jane_Doe_email, that identify other users and the same object type.

After the queues have been generated, the queue service or administrator may then query 710 a cloud storage data source, such as a third party service provider whose user data is stored in cloud storage, such as cloud-based storage 400 (see FIG. 1). At least one purpose of this query is to identify any new/changed user data that needs to be backed up from the third party cloud storage to a cloud storage node operated by a backup service, such as the cloud storage node 500 (see FIG. 1). The query can use, or at least be based upon, the queues that have been generated. For example, the query may, in essence, pose the question—'Does John Doe have emails that require backup?' Thus, this part of the query corresponds to the John_Doe_email message that is included in one of the queues.

The third party service receives 712 the query and examines the stored data to identify any changes 714. The third party service can respond 716 to the query in the negative, or can respond 716 to the query affirmatively by identifying any change(s) to the email(s) of John Doe. The change information is received 718 by the backup service, and the queues finalized 720. For example, if the third party service indicates no changes to the email data object specified by John Doe, the John_Doe_email message can be dropped from the queue that is concerned with the email object type, since there are no changes associated with the email of John Doe. On the other hand, if the third party service indicates any changes associated with the email of John Doe, those changes will be backed up 722 after all email changes for all users have been identified, that is, after the email object type queue has been finalized 720. In connection with the backup 722, and as discussed in more detail below, an auto scaling process 724 may be performed.

With continued attention to FIG. 3, and directing attention briefly now to FIG. 3a, details are provided concerning aspects of some example queue, indicated at 750. In general, the queue 750 identifies, by user and object type, the backup work that is needed to be performed. Thus, the queue 750 is a mail object type indicating that Users 1-n each have mail changes that are required to be backed up. As noted in the discussion of FIG. 3, this information can be in the form of messages that are used to build the queue 750.

As indicated in FIGS. 3 and 3a, backups can be performed based on object type. As such, a mail backup, for example, can span multiple clients and as such, may be application-specific, rather than being specific to a particular user. Because only a single object type is associated with a particular backup, implementation of the backup may be relatively simpler than, for example, a user-based backup that may involve several different object types. Further details concerning queues, their use, and their relation to auto scaling groups are discussed below.

D. Aspects of an Example Topology

Figure 4:
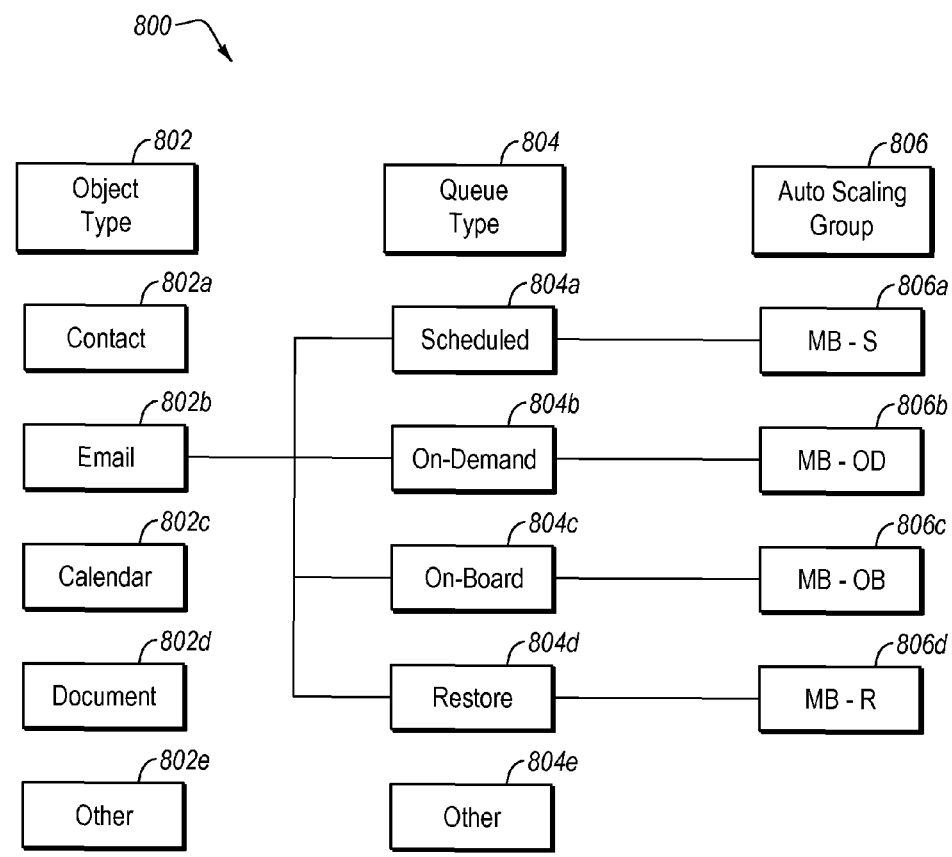
FIG. 4 discloses aspects of an example topology of object types, queue types, group scaler, and relationships between and among these elements.

With continued attention to FIGS. 3 and 3a, and directing attention now to FIG. 4, details are provided concerning an example topology of object types, queue types, group scaler, and relationships between and among these elements. This topology can be used for, among other things, identifying the various backups that are to be performed, as well as to make at least a preliminary identification of an auto scaling group for each backup.

As indicated in the example topology 800 in FIG. 4, one or more object types 802, queue types 804, and auto scaling groups 806 can be defined. For example, object types 802 can generally include any type of object type that is desired to be backed up. In the illustrated example, the object types 802 include contact 802a, email 802b, calendar 802c, document 802d, and any other object type 802e to be backed up.

A variety of queue types 804 can be defined for use in connection with the various object types 802. In the illustrated example, the queue types 804 include scheduled backup 804a, on-demand backup 804b, on-board backup 804c, restore 804d, and any other type of backup 804e desired to be performed. Moreover, each object type 802 can be associated with one or more queue types 804. Thus, in the illustrated example, a first group of emails 802b may be identified in connection with a scheduled backup 804a, a second group of emails 802b may be identified in connection with an on-demand backup 804b such as might be needed by a trial user, a third group of emails 802b may be identified in connection with an on-board backup 804c such as might be needed for a new client of the backup service, and a fourth group of emails 802b may be identified in connection with a restore process 804d.

Once the object type-queue type combinations have been identified, a corresponding auto scaling group 806 for each combination can be defined. Thus, in the illustrated example, a mailbox-scheduled (MB-S) auto scaling group 806a is defined that will perform a scheduled backup of the first group of emails 802b. In similar fashion, a mailbox-on-demand (MB-OD) auto scaling group 806b, a mailbox-on-board (MB-OB) auto scaling group 806c, and a mailbox-restore (MB-R) auto scaling group 806d, are defined. Thus, in these examples at least, each auto scaling group is specific to a particular object type and, correspondingly, a particular application and particular queue. By way of illustration, auto scaling group MB-OD 806b is specific to a mail application that generates a particular object type, that is, emails, that are to be backed up on-demand. Because the auto scaling groups are each application-specific in at least some embodiments, the database server(s) of an auto scaling group may perform backup services for a common object type across multiple different clients.

E. Aspects of Example Auto Scaling Processes

Figure 5:
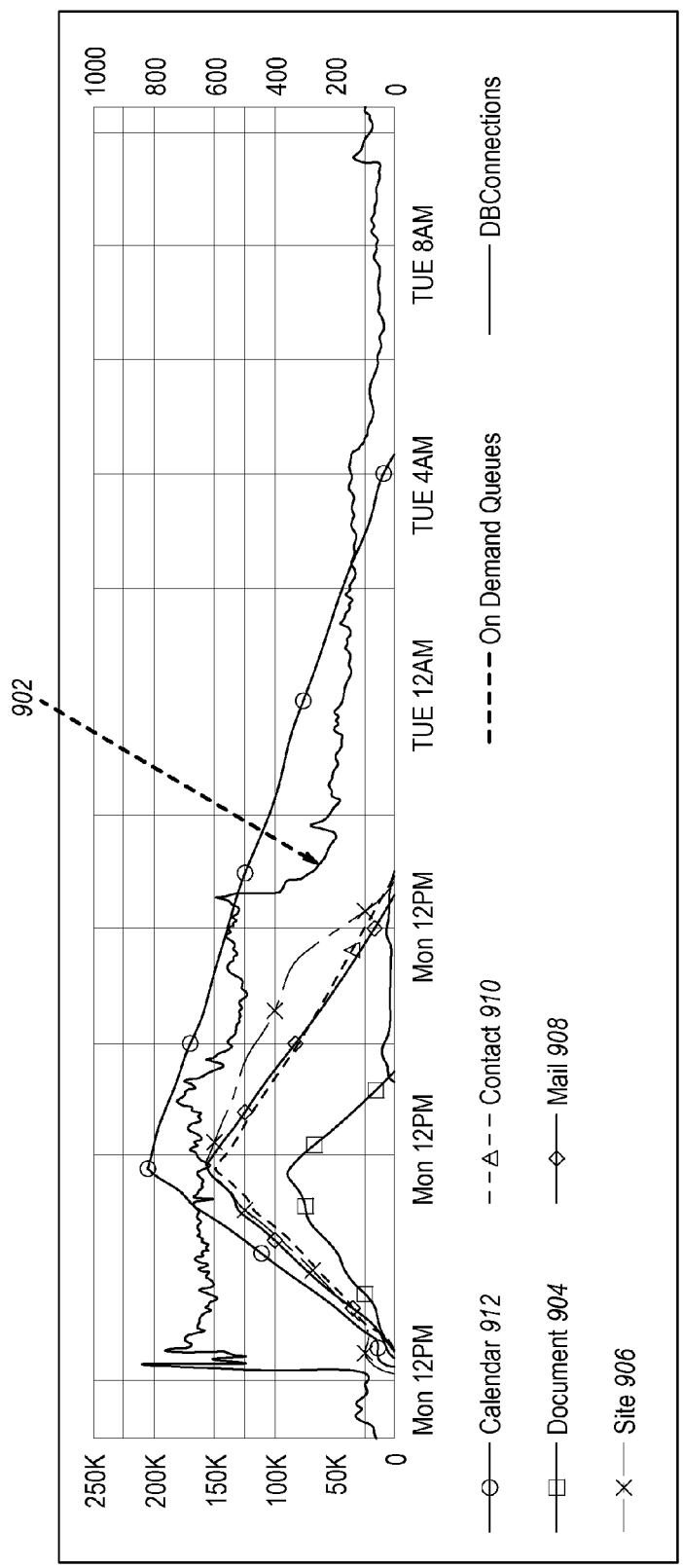
FIG. 5 discloses aspects of an example auto scaling process.
Figure 6:
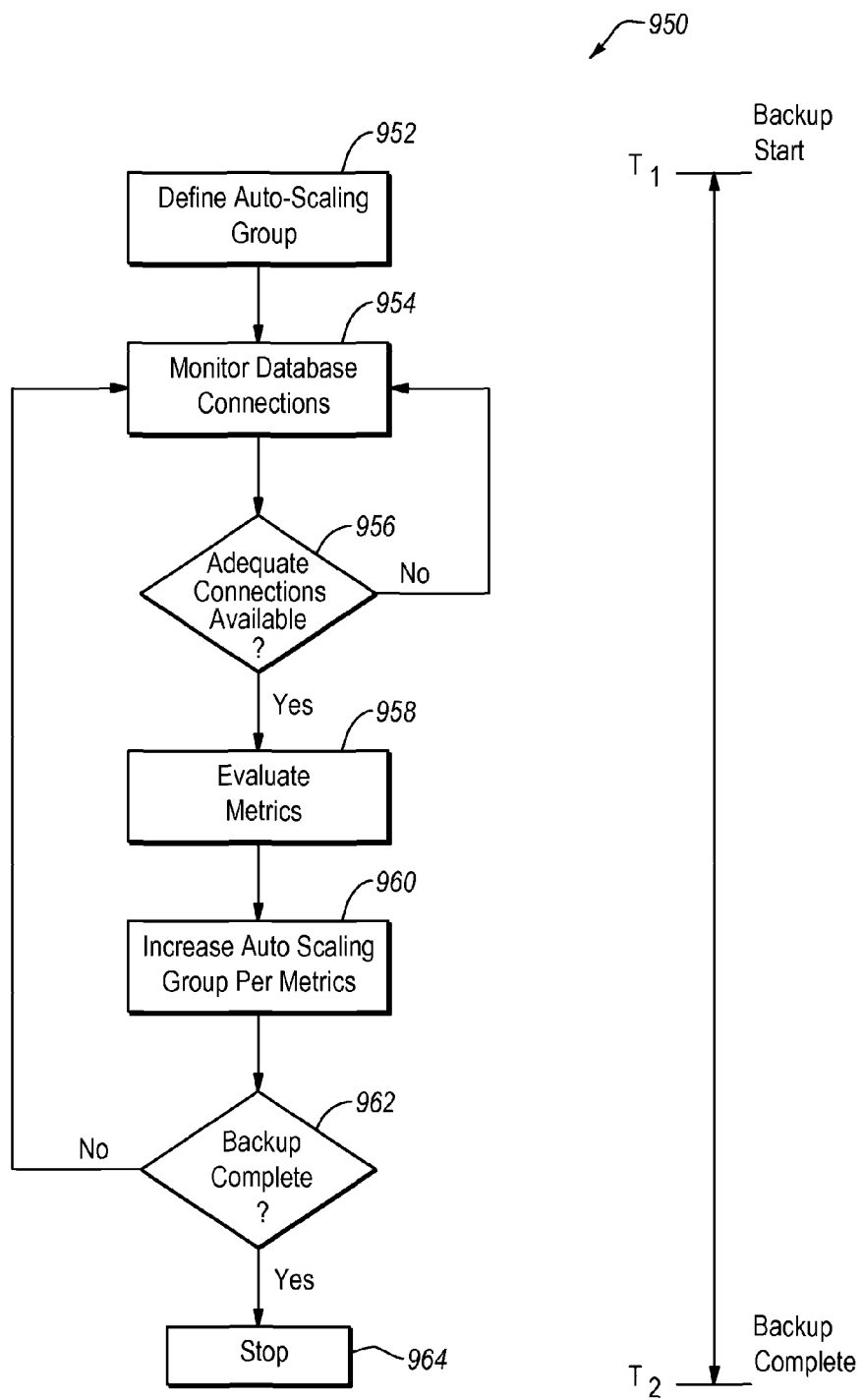
FIG. 6 is a flow diagram that discloses aspects of an example auto scaling process.

With reference now to FIGS. 5 and 6, details are provided concerns aspects of example auto scaling processes. In general, any number of auto scaling processes can be performed at the same time, with one auto scaling process being performed for each different combination of object type-queue type. By way of illustration, an auto scaling process for a scheduled mailbox backup could run at the same time as an auto scaling process for an on-demand contacts backup. The various auto scaling processes can start and/or end at different times or the same time, and can overlap each other. As shown in FIG. 5, the number of database connections 902 available, and employed, can vary up or down with the backup workload. These variations are implemented by one or more auto scaling processes performed by associated group scalers. Thus, at around 8 pm on Monday in this example, document 904, site 906, mail 908, and contact 910 backups have been completed or nearly so and, accordingly, the number of database connections 902 in use drops from approximately 150K to about 50K. The remaining database connections 902 are used for the backup of calendars 912, which completes around 4 am on Tuesday in the illustrated example.

With reference now to FIG. 6, aspects of auto scaling processes, one example of which is denoted at 950, are disclosed. Some or all of the process 950 can be performed by a group scaler (see FIG. 1). It should be noted that depending upon metrics such as the amount of data to be backed up, the queue burn down rate, and the number of available database connections, it may not be necessary to perform an auto scaling process in all instances. That is, it can sometimes be the case that a backup can be timely performed using the resources initially allocated to that backup.

Initially, an auto scaling group is defined 952 for a particular queue, and will be controlled by a corresponding group scaler. The initial size of the auto scaling group can be defined arbitrarily, or based on historical data such as shown in FIG. 5 for example, concerning the extent of backups performed, the resources that were necessary to adequately support those backups, and the type of backups performed. The size of the auto scaling group can also depend on the type of object supported by that auto scaling group. For example, an auto scaling group concerned with performing backups of relatively small objects like contacts might include only 5 database servers while, in comparison, an auto scaling group concerned with performing backups of large volumes of objects such as email might include 30 database servers. In any case, after the auto scaling group has been defined 952, the backup of data identified by the queue with which the auto scaling group is associated can begin at time $T_1$.

As the backup progresses, the group scaler monitors 954 the number of database connections in use in the auto scaling group to determine if any decrease has occurred, that is, to determine if additional database connections may have become available for use in other backups being performed in connection with that auto scaling group. This condition could occur, for example, when one or more queues have been exhausted, or possibly terminated for some other reason, thus freeing database connections for use in other processes.

If it is determined 956 that there are not an adequate number of additional database connections available to support another backup process, the process 950 returns to monitoring 954. On the other hand, if it is determined 956 that there are an adequate number of additional database connections available, various metrics can be evaluated 958 to determine the extent to which the auto scaling group can be increased, while still remaining within a safe connection limit for the associated database servers. As noted elsewhere herein, such metrics can include, but are not limited to, the maximum number of connections supportable by the database servers in the auto-scaling group, the total number of messages in the queue to which additional connections may be assigned, and the queue burn down rate.

The size of the auto scaling group, measured in terms of the number of connections available for a queue, can then be increased 960 based upon the evaluation of the metrics. Unless, or until, the group scaler receives 962 a message indicating that the backup is complete, the process 950 will return to the monitoring stage 954 in an attempt to identify additional backup resources to support the backup. When the group scaler 962 receives a message, such as at time $T_2$, indicating that the backup is complete, the process 950 may terminate 964. Because the group scaler may be monitoring one or more other backups in the auto scaling group, the group scaler may, if circumstances permit, assign the newly freed resources to other backup processes.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for identifying and allocating resources in a computing system, the method comprising:
    checking, while one or more backup processes are running, database connections in an auto scaling group to determine if a number of database connections in use in connection with the backup processes has decreased since a prior check was performed;
    when the number of database connections in use has decreased, identifying which of a plurality of queues each respectively associated with one of the backup processes has the greatest need for additional database connections;
    evaluating a plurality of metrics; and
    based on the evaluation of the metrics, assigning one or more available database connections to the queue with the greatest need for additional database connections.

2. The method as recited in claim 1, wherein the metrics include any one or more of a maximum number of database connections included in the auto scaling group, a total number of messages in each queue, and a burn down rate for each queue.

3. The method as recited in claim 1, wherein the auto scaling group is specific to a particular object type.

4. The method as recited in claim 3, wherein the object type is one of mail, documents, contacts, or calendars.

5. The method as recited in claim 1, wherein each queue includes one or more messages, and each message identifies a user and an object type.

6. The method as recited in claim 1, wherein each backup process is specific to one particular object type.

7. The method as recited in claim 1, wherein a first backup process is an on-demand backup process, a second backup process is a scheduled backup, and a third backup process is an on-board backup.

8. A non-transitory storage medium having stored therein computer-executable instructions which, when executed by one or more hardware processors, identifies and allocates resources in a computing system by performing the following:
    checking, while one or more backup processes are running, database connections in an auto scaling group to determine if a number of database connections in use in connection with the backup processes has decreased since a prior check was performed;
    when the number of database connections in use has decreased, identifying which of a plurality of queues each respectively associated with one of the backup processes has the greatest need for additional database connections;
    evaluating a plurality of metrics; and
    based on the evaluation of the metrics, assigning one or more available database connections to the queue with the greatest need for additional database connections.

9. The non-transitory storage medium as recited in claim 8, wherein the metrics include any one or more of a maximum number of database connections included in the auto scaling group, a total number of messages in each queue, and a burn down rate for each queue.

10. The non-transitory storage medium as recited in claim 8, wherein the auto scaling group is specific to a particular object type.

11. The non-transitory storage medium as recited in claim 10, wherein the object type is one of mail, documents, contacts, or calendars.

12. The non-transitory storage medium as recited in claim 8, wherein each queue includes one or more messages, and each message identifies a user and an object type.

13. The non-transitory storage medium as recited in claim 8, wherein each backup process is specific to one particular object type.

14. The non-transitory storage medium as recited in claim 8, wherein a first backup process is an on-demand backup process, a second backup process is a scheduled backup, and a third backup process is an on-board backup.

15. A physical device, wherein the physical device comprises:
    one or more hardware processors; and
    the non-transitory storage medium as recited in claim 8.

16. A method for backing up data in a computing system, the method comprising:
    generating a list of authorized users;
    identifying object types specified for backup by an authorized users;
    creating a message for each user-object type combination;
    creating a queue for each different object type, and populating each queue with user-object type combinations having an object type to the queue respectively corresponds;
    receiving information indicating that one or more changes have occurred to user data of the specified object types;
    performing a backup of the changes;
    checking, while one or more backup processes are running, database connections in an auto scaling group to determine if a number of database connections in use in connection with the backup processes has decreased since a prior check was performed;
    when the number of database connections in use has decreased, identifying which of a plurality of queues each respectively associated with one of the backup processes has the greatest need for additional database connections;
    evaluating a plurality of metrics; and based on the evaluation of the metrics, assigning one or more available database connections to the queue with the greatest need for additional database connections.

17. The method as recited in claim 16, wherein the metrics include any one or more of a maximum number of database connections included in the auto scaling group, a total number of messages in each queue, and a burn down rate for each queue.

18. The method as recited in claim 16, wherein the auto scaling group is specific to a particular object type.

19. The method as recited in claim 16, wherein the object type is one of mail, documents, contacts, or calendars.

20. A non-transitory storage medium having stored therein computer-executable instructions which, when executed by one or more hardware processors, performs the method recited in claim 16.

* * * * *